(12) United States Patent
Kao et al.

(10) Patent No.: US 10,796,708 B2
(45) Date of Patent: Oct. 6, 2020

(54) METHOD FOR ELIMINATING SOUND AND ELECTRONIC DEVICE PERFORMING THE SAME

(71) Applicant: Unlimiter MFA Co., Ltd., Eden Island, SC (US)

(72) Inventors: Kuo-Wei Kao, Taipei (TW); Cheng-Te Wang, Taipei (TW); Po-Jui Wu, Taipei (TW); Jian-Ying Li, Taipei (TW); Kuo-Ping Yang, Taipei (TW)

(73) Assignee: UNLIMITER MFA CO., LTD., Eden Island (SC)

( * ) Notice: Subject to any disclaimer, the term of this patent is extended or adjusted under 35 U.S.C. 154(b) by 0 days.

(21) Appl. No.: 16/188,409

(22) Filed: Nov. 13, 2018

(65) Prior Publication Data
US 2020/0098382 A1 Mar. 26, 2020

(30) Foreign Application Priority Data
Sep. 25, 2018 (TW) .............................. 107133654 A

(51) Int. Cl.
H04R 29/00 (2006.01)
H04R 3/02 (2006.01)
G10L 21/0232 (2013.01)
G06F 3/16 (2006.01)

(52) U.S. Cl.
CPC .......... *G10L 21/0232* (2013.01); *G06F 3/165* (2013.01); *H04R 29/001* (2013.01)

(58) Field of Classification Search
CPC .... G10L 21/0232; G06F 3/165; H04R 29/001
USPC ............ 381/56, 93, 96, 121, 83, 71.1, 71.8, 381/71.11, 71.12; 379/900
See application file for complete search history.

(56) References Cited

U.S. PATENT DOCUMENTS

2006/0182291 A1* 8/2006 Kunieda .................. G10L 15/00 381/110
2010/0031804 A1* 2/2010 Chevreau ............. G10H 1/0025 84/609

* cited by examiner

*Primary Examiner* — Vivian C Chin
*Assistant Examiner* — Con P Tran
(74) *Attorney, Agent, or Firm* — Bacon & Thomas, PLLC

(57) ABSTRACT

A method for eliminating sound is disclosed. The method is applied to an electronic device capable of connecting with a sound playback device and includes a microphone. The method includes the following steps of: receiving a first input sound via the microphone to acquire a first input sound signal; recording the first input sound signal and transmitting the first input sound signal to the sound playback device; receiving a second input sound from the sound playback device to acquire a second input sound signal, wherein the second input sound is generated by the sound playback device according to the first input sound signal; determining a difference in generation times between the first input sound signal and the second input sound signal; and filtering the second input sound signal according to the difference in generation times and the first input sound signal.

6 Claims, 2 Drawing Sheets

METHOD FOR ELIMINATING SOUND AND ELECTRONIC DEVICE PERFORMING THE SAME

BACKGROUND OF THE INVENTION

1. Field of the Invention

The present invention relates to a method for eliminating sound and an electronic device performing the same, in particular to a method for eliminating sounds generated by other devices and an electronic device performing the same.

2. Description of the Related Art

With gradual upgrades in the efficacy of handheld devices, many video games can be played on smart phones or tablets. In addition, because of advances in network communications, many players can synchronously communicate by voice with other players participating in the same game via the internet. However, some of the players participating in the same game may actually be sitting next to each other. When one of them talks with a remote player via the internet, the sound from the talking player will be sent back via a handheld device held by another player who is next to the talking player, which can result in the same sound being repeatedly transmitted and played back. This can create a feedback loop, which generates unexpected sound that is commonly known as feedback.

Therefore, it is desirable to provide a method to resolve the abovementioned issue.

SUMMARY OF THE INVENTION

The object of the present invention is to provide a method for eliminating sound and an electronic device performing the same.

To achieve the above object, the method for eliminating sound of the present invention is applied in an electronic device. The electronic device is connected with a sound playback device and comprises a microphone. The method for eliminating sound of the present invention comprises the following steps of: receiving a first input sound via the microphone to acquire a first input sound signal; recording the first input sound signal, and transmitting the first input sound signal to the sound playback device; receiving a second input sound from the sound playback device via the microphone to acquire a second input sound signal, wherein the second input sound is generated by the sound playback device according to the first input sound signal; determining a difference in generation times between the first input sound signal and the second input sound signal; and filtering the second input sound signal according to the difference in generation times and the first input sound signal.

The electronic device of the present invention is capable of connecting with a sound playback device and comprises a microphone and a microcontroller. The microphone is used for receiving a first input sound to acquire a first input sound signal. The microcontroller is electrically connected with the microphone and comprises a control module, a calculation module and a filter module. The control module is used for recording the first input sound signal and controlling the first input sound signal to be transmitted to the sound playback device. The microphone is further used for receiving a second input sound from the sound playback device to acquire a second input sound signal after the first input sound signal is transmitted, wherein the second input sound is generated by the sound playback device according to the first input sound signal. The calculation module is used for determining a difference in generation times between the first input sound signal and the second input sound signal. The filter module is used for filtering the second input sound signal according to the difference in generation times and the first input sound signal.

BRIEF DESCRIPTION OF THE DRAWINGS

These and other objects and advantages of the present invention will become apparent from the following descriptions of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

The following embodiments are provided in order to further explain the implementations of the present invention. It should be noted that the objects used in the diagrams of the embodiments are provided with proportions, dimensions, deformations, displacements and details as examples and that the present invention is not limited thereto; identical components in the embodiments are given the same component numbers.

Figure 1:
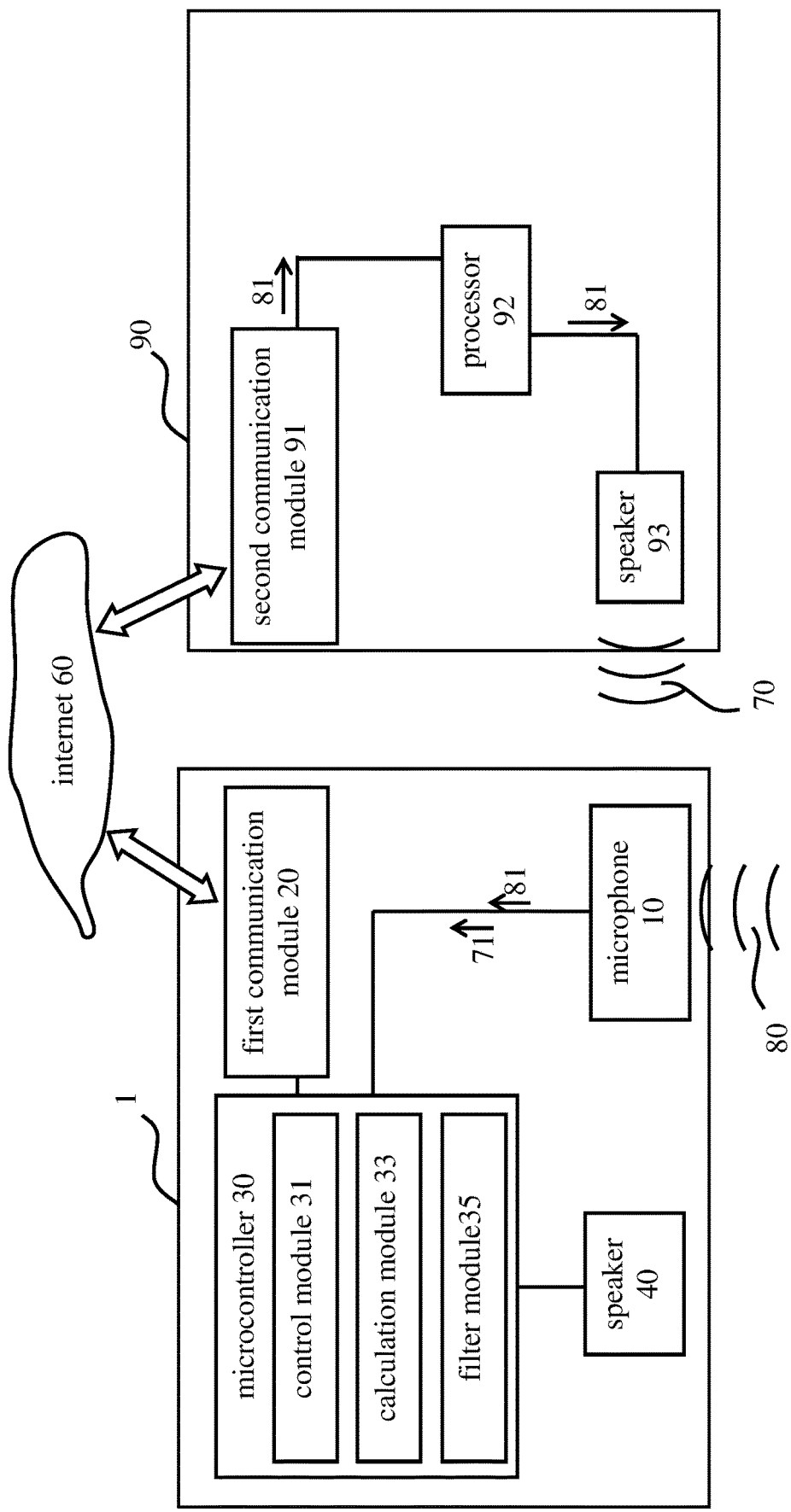
FIG. 1 is a device architecture diagram of the electronic device of the present invention.

First, refer to FIG. 1, which is a device architecture diagram of the electronic device of the present invention.

As shown in FIG. 1, in an embodiment of the present invention, an electronic device 1 of the present invention is capable of connecting with a sound playback device 90 via an internet 60. The sound playback device 90 comprises a second communication module 91, a processor 92, and a speaker 93. The processor 92 is electrically connected with the second communication module 91 and the speaker 93. The electronic device 1 comprises a microphone 10, a first communication module 20, a microcontroller 30 and a speaker 40. In a specific embodiment of the present invention, the electronic device 1 and sound playback device 90 are a smart phone, but the scope of the present invention is not limited thereto.

As shown in FIG. 1, in an embodiment of the present invention, the microphone 10 is used for receiving sounds from the outside, including a first input sound 80 generated by a user and a second input sound 70 generated by the sound playback device 90. The microphone 10 generates a first input sound signal 81 according to the first input sound 80 after receiving the first input sound 80. The first input sound signal 81 is transmitted to the microcontroller 30. Similarly, the microphone 10 generates a second input sound signal 71 according to the second input sound 70 after receiving the second input sound 70. The second input sound signal 71 is also transmitted to the microcontroller 30.

In an embodiment of the present invention, the first communication module 20 is used for signally connecting to the second communication module 91 of the sound playback device 90, such that the electronic device 1 is connected with the sound playback device 90. In a specific embodiment of the present invention, the first communication module 20 and the second communication module 91 are a network interface card so that the electronic device 1 is capable of connecting with the sound playback device 90 via the internet 60, but the scope of the present invention is not limited thereto. Communication between the electronic device 1 and the sound playback device 90 may also occur by any known communication method, such as Bluetooth.

In an embodiment of the present invention, the microcontroller 30 is electrically connected to the microphone 10 and the first communication module 20. The microcontroller 30 comprises a control module 31, a calculation module 33 and a filter module 35. It should be noted that the above respective modules may not only be configured as hardware devices, software programs, firmware, or combinations thereof, but also configured by circuit loop or other suitable types. Also, each of the modules can be configured individually or in combination. A preferred embodiment is that all of the modules are configured as software programs, which are installed into a memory (not shown in figures) of the micro controller 30 and implemented by a processor (not shown in figures) of the micro controller 30 to achieve their functions. Additionally, the preferred embodiment of the present invention described herein is only illustrative. To avoid redundancy, not all the possible combinations of changes are documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on various demands. Other modules or elements may not necessarily exist between any two modules.

In an embodiment of the present invention, the control module 31 is used for recording the first input sound signal 81 and for controlling the first input sound signal 81 to be transmitted to the sound playback device 90 via the first communication module 20. The processor 92 of the sound playback device 90 will transmit the first input sound signal 81 to the speaker 93 after the second communication module 91 of the sound playback device 90 receives the first input sound signal 81. The speaker 93 can generate a second input sound 70 according to the first input sound signal 81.

In an embodiment of the present invention, the calculation module 33 is signally connected to the control module 31. The calculation module 33 is used for determining a difference in generation times between the first input sound signal 81 and the second input sound signal 71. The calculation module 33 can record the amount of time that has passed since receiving the first input sound signal 81, so the calculation module 33 can determine the difference in generation times between the first input sound signal 81 and the second input sound signal 71 after the micro controller 30 acquires the second input sound signal 71.

In an embodiment of the present invention, the filter module 35 is signally connected to the calculation module 33. The filter module 35 is used for filtering the second input sound signal 71 according to the difference in generation times between the first input sound signal 81 and the second input sound signal 71, and according to the first input sound signal 81. It should be noted that the term "filter" used herein refers not to the complete elimination of the second input sound signal 71 but includes the situation that some residual signals may remain due to the limits of the filtering technique. In a specific embodiment of the present invention, the filter module 35 is an Adaptive Filter, but the scope of the present invention is not limited thereto. The method of using the difference in generation times between the first input sound signal 81 and the second input sound signal 71 and using the first input sound signal 81 to filter the second input sound signal 71 will be detailed elsewhere and is omitted herein.

In an embodiment of the present invention, the speaker 40 is electrically connected to the microcontroller 30. The speaker 40 is used for generating sound according to an output sound signal generated by the microcontroller 30.

Figure 2:
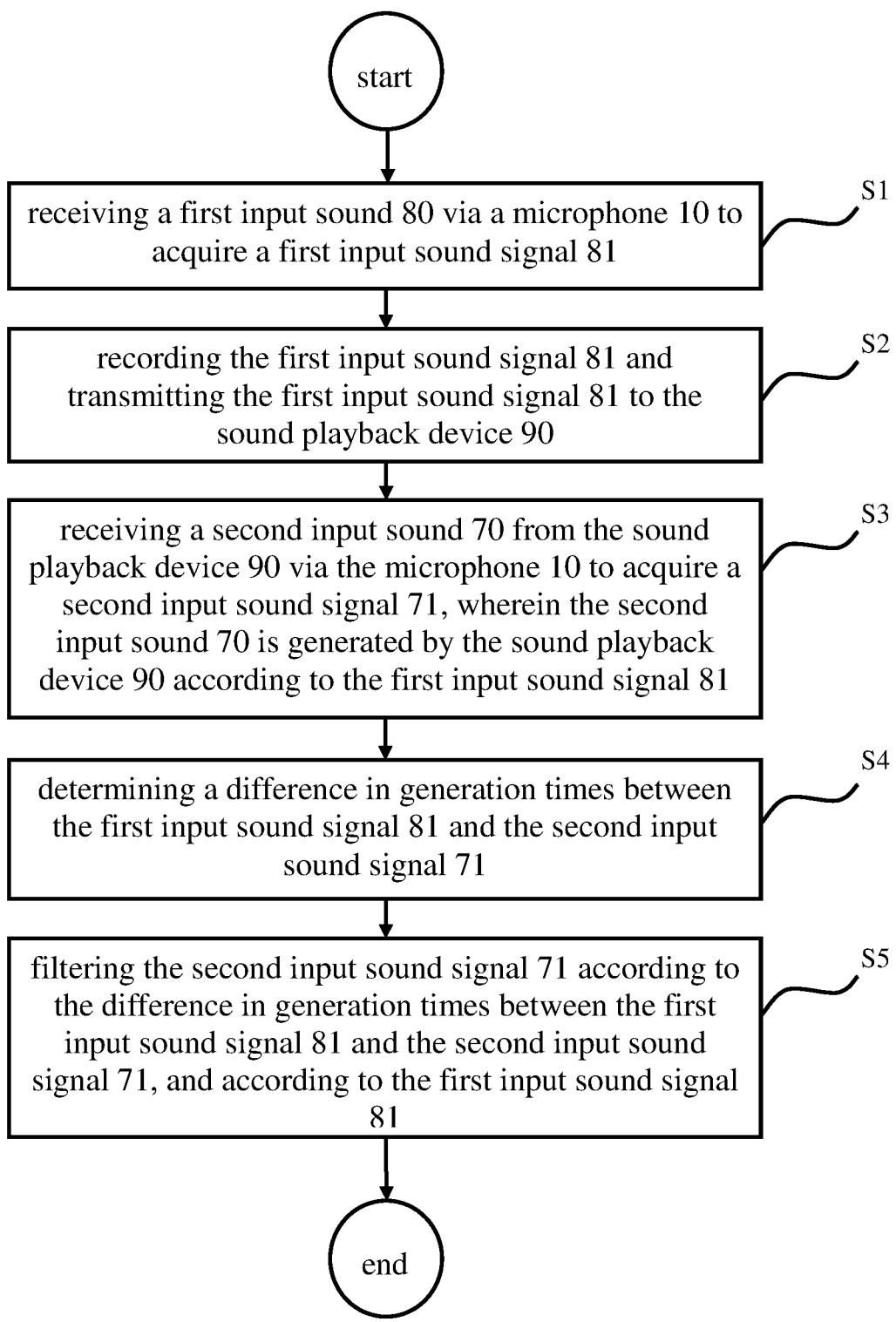
FIG. 2 is a step flowchart of a method for eliminating sound of the present invention.

Next, refer to FIG. 1 to FIG. 2. FIG. 2 is a step flowchart of a method for eliminating sound of the present invention. The steps shown in FIG. 2 are further presented in detail in FIG. 1. It should be noted that the following implementation is based on the electronic device 1 described previously to illustrate the method for eliminating sound according to the present invention. However, the scope of the method for eliminating sound according to the present invention is not limited to the electronic device 1 described previously.

First, executing step S1: receiving a first input sound 80 via a microphone 10 to acquire a first input sound signal 81.

Assume that an electronic device 1 used by a first user and a sound playback device 90 used by a second user are together connected to a device used by a third user at a remote location via an internet 60 to play a video game, and that a distance between the electronic device 1 and the sound playback device 90 is less than 2 meters. When the first user using the electronic device 1 speaks toward a microphone 10 to talk to the third user, the microphone 10 will receive a first input sound 80 from the user using the electronic device 1 and generate a first input sound signal 81 according to the first input sound 80. The first input sound signal 81 can be transmitted to the microcontroller 30 such that the microcontroller 30 receives and acquires the first input sound signal 81.

Executing step S2: recording the first input sound signal 81 and transmitting the first input sound signal 81 to the sound playback device 90.

In an embodiment of the present invention, the control module 31 of the electronic device 1 can record the first input sound signal 81 and control the first input sound signal 81 to be transmitted to other devices which are connected with the electronic device 1, including the sound playback device 90, via the first communication module 20.

Executing step S3: receiving a second input sound 70 from the sound playback device 90 via the microphone 10 to acquire a second input sound signal 71, wherein the second input sound 70 is generated by the sound playback device 90 according to the first input sound signal 81.

When the sound playback device 90 receives the first input sound signal 81, the speaker 93 of the sound playback device 90 can generate a second input sound 70 according to the first input sound signal 81 (assuming that no earphones are used for the sound output of the sound playback device 90 and that the speakers of the sound playback device 90 are activated). Because the distance between the electronic device 1 and the sound playback device 90 is short (about 2 meters or less), the microphone 10 of the electronic device 1 will receive the second input sound 70 generated by the speaker 93 of the sound playback device 90 and generate a second input sound signal 71 according to the second input sound 70. Similarly, the second input sound signal 71 can be transmitted to the microcontroller 30.

Executing step S4: determining a difference in generation times between the first input sound signal 81 and the second input sound signal 71.

When the microcontroller 30 receives and acquires the second input sound signal 71, the calculation module 33 can determine a difference in generation times between the first input sound signal 81 and the second input sound signal 71.

Execute step S5: filtering the second input sound signal 71 according to the difference in generation times between the first input sound signal 81 and the second input sound signal 71, and according to the first input sound signal 81.

The voice content of the second input sound 70 is actually the same as that of the first input sound signal 81, so the microcontroller 30 of the electronic device 1 of the present invention will filter out the second input sound signal 71 to avoid repeated transmission and playback. After step S4 is performed, the filter module 35 of the microcontroller 30 will determine and generate an estimated signal which is the same as or similar to the second input sound signal 71 according to the difference in generation times between the first input sound signal 81 and the second input sound signal 71, and according to the previously recorded first input sound signal 81. The filter module 35 will eliminate the second input sound signal 71 by the estimated signal so that the second input sound signal 71 is filtered. In a specific embodiment, the filter module 35 of the microcontroller 30 may be a conventional adaptive filter, which is widely used for eliminating feedback sound. The adaptive filter can generate an estimated signal which is the same as or similar to the feedback sound by adjusting the weight of the filter immediately to eliminate the feedback sound by the estimated signal. In general, the adaptive filter needs a previous signal to be the basis for calculation and generation of an estimated signal in order that the adaptive filter can quickly calculate and generate the estimated signal. In this embodiment, the generation time of the first input sound signal 81 and that of the second input sound signal 71 are quite different because the first input sound signal 81 is transmitted to the sound playback device 90 via the internet 60. If the difference in generation times between the first input sound signal 81 and the second input sound signal 71 is not determined, the first input sound signal 81 to be utilized cannot be quickly and accurately found, and the calculation for a processing unit will consume a lot of time or even be impossible. Thus, in the embodiment of the present invention, the microcontroller 30 first determines a difference in generation times between the first input sound signal 81 and the second input sound signal 71, and then quickly identifies the first input sound signal 81 according to the difference. The microcontroller 30 can determine an estimated signal which is the same as or similar to the second input sound signal 71 according to the first input sound signal 81 and then filter the second input sound signal 71 by the estimated signal. Determining a later signal by a previous signal is a prior art for eliminating a sound signal and is known by many skilled persons and detailed in many articles, so description of that method is omitted herein.

While the present invention has been particularly shown and described with reference to a preferred embodiment, it will be understood by those skilled in the art that various changes and modifications can be made to the described embodiments. It is intended to include all such variations, modifications and equivalents which fall within the scope of the invention, as defined in the accompanying claims. It is to be understood that many other possible modifications and variations can be made without departing from the spirit and scope of the invention as hereinafter claimed.

What is claimed is:

1. A method for eliminating sound, which is applied to an electronic device capable of connecting with a sound playback device and comprises a microphone, the method comprising the following steps:
   receiving a first input sound via the microphone to acquire a first input sound signal;
   recording the first input sound signal and transmitting the first input sound signal to the sound playback device;
   receiving a second input sound from the sound playback device via the microphone to acquire a second input sound signal, wherein the second input sound is generated by the sound playback device according to the first input sound signal;
   determining a difference in generation times between the first input sound signal and the second input sound signal by recording passed time from receiving the first input sound signal to acquiring the second input sound signal; and
   filtering the second input sound signal according to the difference in generation times and the first input sound signal.

2. The method as claimed in claim 1, wherein the electronic device is connected with the sound playback device via an internet, such that the first input sound signal is transmitted to the sound playback device via the internet.

3. The method as claimed in claim 1, wherein a distance between the electronic device and the sound playback device is less than 2 meters.

4. An electronic device, which is capable of connecting with a sound playback device, comprising:
   a microphone, used for receiving a first input sound to acquire a first input sound signal;
   a microcontroller, electrically connected with the microphone, comprising:
   a control module, used for recording the first input sound signal, and for controlling the first input sound signal to be transmitted to the sound playback device; the microphone being further used for receiving a second input sound from the sound playback device to acquire a second input sound signal after the first input sound signal is transmitted, wherein the second input sound is generated by the sound playback device according to the first input sound signal;
   a calculation module, used for determining a difference in generation times between the first input sound signal and the second input sound signal by recording passed time from receiving the first input sound signal to acquiring the second input sound signal; and
   a filter module, used for filtering the second input sound signal according to the difference in generation times and the first input sound signal.

5. The electronic device as claimed in claim 4, wherein the electronic device is connected with the sound playback device via an internet, such that the first input sound signal is transmitted to the sound playback device via the internet.

6. The method as claimed in claim 4, wherein a distance between the electronic device and the sound playback device is less than 2 meters.

* * * * *